United States Patent Office 3,355,678
Patented Nov. 28, 1967

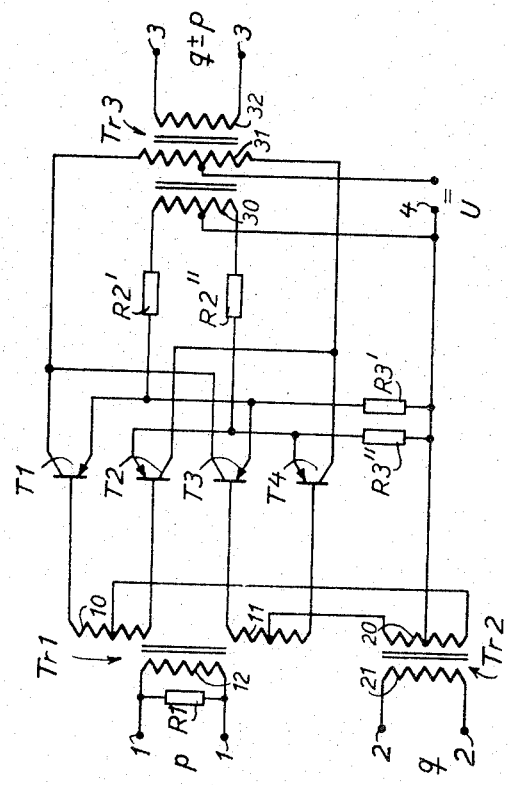

3,355,678
MODULATOR CONNECTION WITH COMBINED CURRENT AND VOLTAGE FEED-BACK
Friedrich Karl Peter Echarti, Enskede, Sweden, assignor to Telefonaktiebolaget L M Ericsson, Stockholm, Sweden, a corporation of Sweden
Filed Nov. 13, 1964, Ser. No. 410,967
Claims priority, application Sweden, Nov. 27, 1963, 13,109/63
1 Claim. (Cl. 332—43)

ABSTRACT OF THE DISCLOSURE

There is disclosed a modulator comprising a modulating signal input transformer, a carrier frequency signal input transformer, a modulated signal output transformer, and first and second pairs of transistors. The base electrodes of the first pair of transistors are connected to one center-tapped secondary winding and the base electrodes of the second pair of transistors are connected to another center-tapped secondary winding of the modulating signal transformer. The secondary winding (which is also center-tapped) of the carrier frequency signal transformer is connected to center taps of the aforesaid secondary windings. The center tap of this winding is connected to one terminal of an operating voltage source. The modulated signal transformer has two primary center-tapped windings. The center taps of these windings are connected to two different terminals of the operating voltage source, respectively. One of the primary windings of the modulated signal transformer is connected via resistors to interconnected collector electrodes of one transistor of each pair, the other of these primary windings is connected to interconnected collector electrodes of the other transistor of each pair. Interconnected emitter electrodes, one from each pair of transistors, are connected via further resistors to the aforesaid one terminal of the operating voltage source.

---

The present invention refers to modulators and more particularly to modulators comprising two pairs of transistors which are connected in parallel for the carrier frequency voltage and are push-pull connected for the signal voltage. In each pair of transistors the base electrodes are connected to the winding of a first transformer through which the signal voltage is fed to the modulator. These windings in their turn are connected by a winding of a second transformer, through which the carrier frequency voltage is fed to the modulator. The collector electrodes in each pair are connected to each other and the connecting points are connected by a first winding of a third transformer, from which the modulated signal voltage is obtained from the modulator. In addition, the corresponding emitter-electrodes in each pair being connected to each other.

In modulators employing transistors of the pnp- or npn-type it is desired to avoid power loss to as great an extent as possible with regard to the modulation limit. As is known the total power is divided into the two sidebands obtained after the modulation. Normally only one of these side-bands is used, consequently half of the power cannot be used. In most cases a current feed-back is used in the modulator, and thereby the internal resistance of the modulator seen from the output will become high. In order to get a suitable match to the output circuit a resistance is connected in parallel to the primary winding of the output transformer. Thereby further power will be lost in this parallel connected resistance. The total decrease of the input power will therefore be considerable. An object of the present invention is therefore to achieve a modulator connection in which this great loss of power will be diminished. This is accomplished by using an arrangement in accordance with the invention in modulators, which comprise two pairs of transistors, one output transformer and two input transformers, through which the signal voltage and the carrier frequency voltage is supplied, respectively. These components are connected in the way mentioned above. The arrangement is characterized in that resistances are connected on one hand between the connection points between the emitter electrodes and a second winding of the third transformer, and on the other hand between the emitter connection points and a terminal of the winding of the second transformer and that the terminal of the second transformer is connected to a terminal of the second winding of the third transformer. Accordingly, a combined current and voltage feed-back is obtained in the modulator, so that an adjustment of the internal resistance of the modulator seen from the output of the modulator is made possible, and that the effect given by the transistors mainly is to be found in an output winding of the third transformer.

The invention will be further described in connection with the sole figure of the accompanying drawing, where a modulator according to the invention is shown. The modulator comprises four transistors, T1, T2, T3, T4 which can be of pnp- or npn-type, and three transformers Tr1, Tr2, Tr3. Via the transformer Tr1 the modulator is supplied with the modulating signal voltage and via the transformer Tr2 with carrier frequency voltage. Via the transformer Tr3 the modulated signal voltage from the modulator is obtained, the transformer Tr1 is provided with two secondary windings 10 and 11, which are connected to the base electrodes of the transistors T1 and T2, and T3 and T4, respectively. Each of the windings 10 and 11 is furthermore provided with a center tap, which are connected to the secondary winding 20 of the transformer Tr2. Winding 20 is provided with a center tap, which is connected to one pole of the direct-current source 4 with the voltage U. The collector electrodes of the transistors T1 and T3, and T2 and T4 respectively are connected and the connection points are in their turn connected through a winding 31 of the trasformer Tr3. The winding 31 of the transformer Tr3 is also provided with a center tap, which is connected to the other pole of said direct-current source 4. The emitter-electrodes of the transistors T1 and T3, and T2 and T4, respectively are connected and the connection points then obtained are, via resistances R2' and R2" connected by a third winding 30 of the transformer Tr3. This winding is provided with a center tap, which is connected to the one pole of the voltage source 4. Between this pole and connecting points of the emitter electrodes are arc connected resistances R3' and R3".

The transformer Tr1 is further provided with a primary winding 12 across which a resistance R1 is connected in parallel, which resistance is connected to the input terminals 1, 1 for the modulating signal voltage p. The transformer Tr2 is provided with a primary winding 21 which is connected to the input terminals 2, 2 for the carrier frequency voltage q. The transformer Tr3, finally, is provided with an output winding 32, which is connected to the output terminals 3, 3 for the modulated voltage $q \pm p$. The modulating signal voltage p is, consequently supplied over the terminals 1, 1 and the carrier frequency voltage q over the terminals 2, 2. The carrier frequency voltage is fed from the secondary winding 20 to center taps of the windings 10 and 11 of the transformer Tr1. The windings 10 and 11 are thereby so designed that the voltage that arrives at the winding 10 is 180° phase shifted in relation to the voltage that arrives at the winding 11. During positive half periods or cycles of the carrier frequency voltage the base electrodes of the transistors T3 and T4 will thereby be supplied with a positive voltage and the base electrodes of transistors T1 and T2 with a negative voltage. During negative half periods, on the other hand, the base electrode of transistors T1 and T2 will receive a positive voltage and of transistors T3 and T4 a negative voltage. By the different shape of the windings 10 and 11 the signals that pass through the winding 10 will be 180° phase shifted in relation to the signals through the winding 11. In the output transformer Tr3 therefore an output voltage is obtained during the positive as well as the negative half period of the carrier frequency voltage, at which the voltage during the positive half period is 180° phase shifted in relation to the voltage during the negative half period.

By virtue of the resistances R3' and R3" connected in the modulator the operating points of the transistors are so adjusted, that the modulator has suitable amplification. Furthermore these resistances cause a stabilization of the operating points of the transistors at changes in current amplification and temperature.

The resistances R2' and R2" mentioned above constitute together with the winding 30 of the output transformer Tr3 a feed-back network in the modulator. By aid of this network part of the voltage obtained in the output transformer is fed back. By this network a combined current and voltage feed-back in the modulator is achieved. By choosing a suitable transformation ratio between the windings of the transformer Tr3 and also by selecting suitable values to the resistances R2' and R2" the internal resistance of the modulator can be determined. This means that a desired value of the internal resistance of the modulator can be chosen without influencing the amplification of the modulator. An adaptation to an actual load causes, consequently, only an adjustment of the feed-back in form of a determination of the transformation ratio of the output transformer and of the resistances of the feed-back network. The amplification of the modulator and the advantages obtained because of the feed-back, will, however, be maintained. For the adaptation to the load no connection of a resistance in parallel with the primary winding of the output transformer will thus be necessary and there will be no resulting loss of power in such a resistance, but the power generated in the transistors will, without losses, mainly be found in the output winding of the transformer.

Because of the above mentioned loss of power in the modulator one had been previously forced to use an amplifier after the modulator, which had been the case within for instance the carrier frequency techniques. By using an arrangement in accordance with the invention this combination of a modulator and an amplifier will be unnecessary and the same result can be achieved by a modulator only.

I claim:
A modulator circuit comprising in combination:
a first transformer having a primary winding adapted to receive a modulating signal and first and second center-tapped secondary windings;
a second transformer having a primary winding adapted to receive a carrier signal and a center-tapped secondary winding, the center taps of the first and second secondary windings of said first transformer being connected to the legs of the secondary winding of said second transformer, respectively;
first, second, third and fourth transistors, each of said transistors having base, collector and emitter electrodes;
means for connecting the base electrodes of said first and second transistors to the legs of the first secondary winding of said first transformer, respectively;
means for connecting the base electrodes of said third and fourth transistors to the legs of the second secondary winding of said first transformer, respectively;
a third transformer having first and second center-tapped primary windings and a secondary winding adapted to transmit a modulated carrier signal;
a source of operating voltage having first and second terminals;
means for connecting the center taps of the secondary winding of said second transformer and of the first primary winding of said third transformer to the first terminal of said source of operating voltage;
means for connecting the center tap of the second primary winding of said third transformer to the second terminal of said source of operating voltage;
means for interconnecting the collector electrodes of said first and third transistors and one leg of the second primary winding of said third transformer;
means for interconnecting the collector electrodes of said second and fourth transistors and the other leg of the second primary winding of said third transformer, means for interconnecting the emitter electrodes of said first and third transistors;
means for interconnecting the emitter electrodes of said second and fourth transistors;
first impedance means connecting the interconnected emitter electrodes of said first and third transistors to one leg of the first primary winding of said third transformer;
second impedance means connecting the interconnected emitter electrodes of said second and fourth transistors to the other leg of said first primary winding of said third transformer;
third impedance means connecting the interconnected emitter electrodes of said first and third transistors to the first terminal of said source of operating voltage; and
fourth impedance means connecting the interconnected emitter electrodes of said second and fourth transistors to the first terminal of said source of operating voltage.

References Cited

UNITED STATES PATENTS

| | | | |
|---|---|---|---|
| 2,456,494 | 12/1948 | Ensink | 332—43 |
| 2,645,710 | 7/1953 | Hartz | 332—43 X |
| 3,064,200 | 11/1962 | Brown | 330—79 X |
| 3,239,780 | 3/1966 | Echarti | 332—43 |

ALFRED L. BRODY, *Primary Examiner.*